United States Patent
Karunanithi et al.

(10) Patent No.: US 10,979,754 B1
(45) Date of Patent: *Apr. 13, 2021

(54) REACH AND FREQUENCY ESTIMATOR

(71) Applicant: CSC Holdings, LLC, Bethpage, NY (US)

(72) Inventors: Nandhita Karunanithi, Syosset, NY (US); Colleen Moraghan, Cold Spring Harbor, NY (US); Dale Thomas, Bayside, NY (US); Eileen Cook, Smithtown, NY (US); Paul Haddad, New York, NY (US); Wael Sabra, Forest Hills, NY (US)

(73) Assignee: CSC Holdings, LLC, Bethpage, NY (US)

(*) Notice: Subject to any disclaimer, the term of this patent is extended or adjusted under 35 U.S.C. 154(b) by 92 days.

This patent is subject to a terminal disclaimer.

(21) Appl. No.: 16/125,189

(22) Filed: Sep. 7, 2018

Related U.S. Application Data

(63) Continuation of application No. 15/173,246, filed on Jun. 3, 2016, now Pat. No. 10,075,756.

(51) Int. Cl.
H04N 21/2668 (2011.01)
H04N 21/25 (2011.01)
H04N 21/81 (2011.01)
H04N 21/442 (2011.01)
H04N 21/61 (2011.01)

(52) U.S. Cl.
CPC ....... *H04N 21/2668* (2013.01); *H04N 21/252* (2013.01); *H04N 21/44213* (2013.01); *H04N 21/6118* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 6,286,005 B1 * | 9/2001 | Cannon | G06Q 30/02 455/2.01 |
| 2013/0205339 A1 * | 8/2013 | Haberman | H04N 21/8456 725/35 |
| 2013/0219427 A1 | 8/2013 | Zundel et al. | |
| 2016/0373792 A1 | 12/2016 | Meyer | |
| 2017/0094337 A1 | 3/2017 | Fu et al. | |
| 2017/0127110 A1 | 5/2017 | Chaar et al. | |
| 2017/0347160 A1 * | 11/2017 | Emans | H04N 21/251 |

* cited by examiner

Primary Examiner — Jason K Lin
(74) Attorney, Agent, or Firm — Sterne, Kessler, Goldstein & Fox P.L.L.C.

(57) ABSTRACT

Embodiments utilize viewership data collected via a set top box (STB) at individual households (HHs) to enable a network operator to recommend ad spots to customers based on a percentage of HHs that are likely to view the ad spots (e.g., the % of HHs reached by the ad spots), and/or based on the average number of times (e.g., average frequency) that the reached HHs are likely to view the ad spot. Embodiments compile the available network/daypart ad spots per broadcast week, and determine a number of ad spots for each network/daypart that satisfy a reached threshold of HHs, and/or satisfies the minimum frequency threshold.

20 Claims, 14 Drawing Sheets

| Day | Time | Number of Households |
|---|---|---|
| 1 | 22:00:00-22:14:59 | 1000 |
| 1 | 22:15:00-22:29:59 | 1200 |

| Ad ID | Day | Time | Number of Households Seeing Ad |
|---|---|---|---|
| 1 | 2 | 22:13:44 | 1000 |
| 2 | 2 | 22:25:30 | 1200 |
| Total | | | ??? |

| Household | Day | Time | Probability of Viewing TV |
|---|---|---|---|
| A | 1 | 22:00:00-22:14:59 | 0.4 |
| A | 1 | 22:15:00-22:29:59 | 0.5 |
| B | 1 | 22:00:00-22:14:59 | 0.2 |
| B | 1 | 22:15:00-22:29:59 | 0.8 |
| C | 1 | 22:00:00-22:14:59 | 0.6 |
| C | 1 | 22:15:00-22:29:59 | 0.3 |
| D | 1 | 22:00:00-22:14:59 | 0.1 |
| D | 1 | 22:15:00-22:29:59 | 0.02 |
| E | 1 | 22:00:00-22:14:59 | 0.5 |
| E | 1 | 22:15:00-22:29:59 | 0.4 |
| F | 1 | 22:00:00-22:14:59 | 0.1 |
| F | 1 | 22:15:00-22:29:59 | 0.3 |

| Distinct Households | Number of Impressions |
|---|---|
| A | 2 |
| B | 1 |
| C | 1 |
| E | 2 |
| Total | 6 |

FIG. 4

Table 600: # of impressions for each HH watching a NWG_DP_BW

| BCAST_WK | NWG | DP | # of Qtrs | HH1 | HH2 | HH3 | HH4 | ... | HH17 | HH18 | HH19 | HH20 |
|---|---|---|---|---|---|---|---|---|---|---|---|---|
| 1 | A | 1 | 224 | - | 84 | - | 56 | | 84 | 112 | - | 168 |
| 1 | A | 2 | 224 | - | 56 | 140 | 140 | | 56 | 140 | - | - |
| 1 | B | 1 | 224 | 112 | 56 | - | - | | 84 | 196 | - | - |
| 1 | B | 2 | 224 | - | 112 | - | 112 | | 112 | 112 | 224 | - |
| 1 | C | 1 | 224 | - | 84 | - | - | | - | 56 | 84 | 56 |
| 1 | C | 2 | 224 | - | 84 | - | - | | - | 140 | - | 112 |
| 2 | A | 1 | 224 | - | 84 | - | 56 | | 84 | 112 | - | 168 |
| 2 | A | 2 | 224 | - | 56 | 140 | 140 | | 56 | 140 | - | - |
| 2 | B | 1 | 224 | 112 | 56 | - | - | | 84 | 196 | - | - |
| 2 | B | 2 | 224 | - | 112 | - | 112 | | 112 | 112 | 224 | - |
| 2 | C | 1 | 224 | - | 84 | - | - | | - | 56 | 84 | 56 |
| 2 | C | 2 | 224 | - | 84 | - | - | | - | 140 | - | 112 |
| 3 | A | 1 | 224 | - | 84 | - | 56 | | 84 | 112 | - | 168 |
| 3 | A | 2 | 224 | - | 56 | 140 | 140 | | 56 | 140 | - | - |
| 3 | B | 1 | 224 | 112 | 56 | - | - | | 84 | 196 | - | - |
| 3 | B | 2 | 224 | - | 112 | - | 112 | | 112 | 112 | 224 | - |
| 3 | C | 1 | 224 | - | 84 | - | - | | - | 56 | 84 | 56 |
| 3 | C | 2 | 224 | - | 84 | - | - | | - | 140 | - | 112 |
| 4 | A | 1 | 224 | - | 84 | - | 56 | | 84 | 112 | - | 168 |
| 4 | A | 2 | 224 | - | 56 | 140 | 140 | | 56 | 140 | - | - |
| 4 | B | 1 | 224 | 112 | 56 | - | - | | 84 | 196 | - | - |
| 4 | B | 2 | 224 | - | 112 | - | 112 | | 112 | 112 | 224 | - |
| 4 | C | 1 | 224 | - | 84 | - | - | | - | 56 | 84 | 56 |
| 4 | C | 2 | 224 | - | 84 | - | - | | - | 140 | - | 112 |

FIG. 6

Table 700: Estimated Probability of a HH watching a given NWG_DP_BW

| BCAST_WK | NWG | DP | HH1 | HH2 | HH3 | HH4 | ... | HH17 | HH18 | HH19 | HH20 |
|---|---|---|---|---|---|---|---|---|---|---|---|
| 1 | A | 1 | - | 0.375 | - | 0.250 | ... | 0.375 | 0.500 | - | 0.750 |
| 1 | A | 2 | - | 0.250 | 0.625 | 0.625 | ... | 0.250 | 0.625 | - | - |
| 1 | B | 1 | 0.500 | 0.250 | - | - | ... | 0.375 | 0.875 | 1.000 | - |
| 1 | B | 2 | - | 0.500 | - | 0.500 | ... | 0.500 | 0.500 | 0.375 | 0.250 |
| 1 | C | 1 | - | 0.375 | - | - | ... | - | 0.250 | - | 0.500 |
| 1 | C | 2 | - | 0.375 | - | 0.250 | ... | 0.375 | 0.625 | - | 0.750 |
| 2 | A | 1 | - | 0.250 | 0.625 | 0.625 | ... | 0.250 | 0.500 | - | - |
| 2 | A | 2 | 0.500 | 0.250 | - | - | ... | 0.375 | 0.625 | - | - |
| 2 | B | 1 | - | 0.500 | - | 0.500 | ... | 0.500 | 0.875 | 1.000 | 0.250 |
| 2 | B | 2 | - | 0.375 | - | - | ... | - | 0.250 | 0.375 | 0.500 |
| 2 | C | 1 | - | 0.375 | - | 0.250 | ... | 0.375 | 0.625 | - | 0.750 |
| 2 | C | 2 | - | 0.250 | 0.625 | 0.625 | ... | 0.250 | 0.500 | - | - |
| 3 | A | 1 | 0.500 | 0.250 | - | - | ... | 0.375 | 0.625 | - | - |
| 3 | A | 2 | - | 0.500 | - | 0.500 | ... | 0.500 | 0.875 | 1.000 | 0.250 |
| 3 | B | 1 | - | 0.375 | - | - | ... | - | 0.250 | 0.375 | 0.500 |
| 3 | B | 2 | - | 0.375 | - | 0.250 | ... | 0.375 | 0.625 | - | 0.750 |
| 3 | C | 1 | - | 0.250 | 0.625 | 0.625 | ... | 0.250 | 0.500 | - | - |
| 3 | C | 2 | 0.500 | 0.250 | - | - | ... | 0.375 | 0.625 | - | - |
| 4 | A | 1 | - | 0.500 | - | 0.500 | ... | 0.500 | 0.875 | 1.000 | 0.250 |
| 4 | A | 2 | - | 0.375 | - | - | ... | - | 0.250 | 0.375 | 0.500 |
| 4 | B | 1 | 0.500 | 0.250 | - | - | ... | 0.375 | 0.875 | 1.000 | - |
| 4 | B | 2 | - | 0.500 | - | 0.500 | ... | 0.500 | 0.500 | 0.375 | 0.250 |
| 4 | C | 1 | - | 0.375 | - | - | ... | - | 0.250 | - | 0.500 |
| 4 | C | 2 | - | 0.375 | - | - | ... | - | 0.625 | - | 0.500 |

FIG. 7

Table 800: Inventory for BCAST_WK, NWG, DP

| BCAST_WK | NWG | DP | CPCTY | SOLD | AVAIL |
|---|---|---|---|---|---|
| 1 | A | 1 | 20 | 10 | 10 |
| 1 | A | 2 | 20 | 11 | 9 |
| 1 | B | 1 | 20 | 21 | - |
| 1 | B | 2 | 20 | 20 | - |
| 1 | C | 1 | 20 | 13 | 7 |
| 1 | C | 2 | 20 | 14 | 6 |
| 2 | A | 1 | 20 | 20 | - |
| 2 | A | 2 | 20 | 20 | - |
| 2 | B | 1 | 20 | 16 | 4 |
| 2 | B | 2 | 20 | 20 | - |
| 2 | C | 1 | 20 | 14 | 6 |
| 2 | C | 2 | 20 | 18 | 2 |
| 3 | A | 1 | 20 | 16 | 4 |
| 3 | A | 2 | 20 | 15 | 5 |
| 3 | B | 1 | 20 | 16 | 4 |
| 3 | B | 2 | 20 | 17 | 3 |
| 3 | C | 1 | 20 | 18 | 2 |
| 3 | C | 2 | 20 | 18 | 2 |
| 4 | A | 1 | 20 | 17 | 3 |
| 4 | A | 2 | 20 | 15 | 5 |
| 4 | B | 1 | 20 | 15 | 5 |
| 4 | B | 2 | 20 | 17 | 4 |
| 4 | C | 1 | 20 | 15 | 5 |
| 4 | C | 2 | 20 | 18 | 2 |

FIG. 8

Table 900: Likelihood of a HH watching 1 Ad Spot based on Inventory for a given NWG, DP (NWG_DP_BW)

| BCAST_WK | NWG | DP | MAX_AVAIL_SPOTS | INDEX | HH1 | HH2 | HH3 | HH4 | ... | HH17 | HH18 | HH19 | HH20 | # of HHs Reached |
|---|---|---|---|---|---|---|---|---|---|---|---|---|---|---|
| 1 | A | 1 | 7 | 135 | - | 0.963 | - | 0.867 | | 0.963 | 0.992 | - | 1.000 | 10 |
| 1 | A | 2 | 6 | 78 | - | 0.822 | 0.997 | 0.997 | | 0.822 | 0.997 | - | - | 8 |
| 1 | B | 1 | 0 | 115 | - | - | - | - | | - | - | - | - | 0 |
| 1 | B | 2 | 0 | 103 | - | - | - | - | | - | - | - | - | 0 |
| 1 | C | 1 | 5 | 63 | - | 0.905 | - | 0.969 | | - | 0.763 | 0.905 | 0.763 | 11 |
| 1 | C | 2 | 4 | 99 | - | 0.847 | - | - | | - | 0.980 | - | 0.938 | 8 |
| 2 | A | 1 | 0 | 135 | - | - | - | - | | - | - | - | - | 0 |
| 2 | A | 2 | 0 | 78 | - | - | - | - | | - | - | - | - | 0 |
| 2 | B | 1 | 3 | 115 | - | 0.578 | - | - | | 0.756 | - | - | - | 9 |
| 2 | B | 2 | 0 | 103 | - | - | - | - | | - | - | - | - | 0 |
| 2 | C | 1 | 4 | 63 | - | 0.847 | - | 0.938 | | - | 0.684 | 0.847 | 0.684 | 11 |
| 2 | C | 2 | 1 | 99 | - | 0.375 | - | - | | - | 0.625 | - | 0.500 | 3 |
| 3 | A | 1 | 3 | 135 | - | 0.756 | - | 0.578 | | 0.756 | 0.875 | - | 0.984 | 9 |
| 3 | A | 2 | 3 | 78 | - | 0.578 | 0.947 | 0.947 | | 0.578 | 0.947 | - | - | 8 |
| 3 | B | 1 | 3 | 115 | 0.875 | 0.578 | - | - | | 0.756 | 0.998 | - | - | 9 |
| 3 | B | 2 | 2 | 103 | - | 0.750 | - | 0.500 | | 0.750 | 0.750 | 1.000 | - | 9 |
| 3 | C | 1 | 1 | 63 | - | 0.375 | - | - | | - | 0.250 | 0.375 | 0.250 | 2 |
| 3 | C | 2 | 1 | 99 | - | 0.375 | - | - | | - | 0.625 | - | 0.500 | 3 |
| 4 | A | 1 | 2 | 135 | - | 0.609 | - | 0.438 | | 0.609 | 0.750 | - | 0.938 | 9 |
| 4 | A | 2 | 3 | 78 | 0.875 | 0.578 | 0.947 | 0.947 | | 0.578 | 0.947 | - | - | 8 |
| 4 | B | 1 | 3 | 115 | - | 0.578 | - | - | | 0.756 | 0.998 | - | - | 9 |
| 4 | B | 2 | 3 | 103 | - | 0.875 | - | 0.875 | | 0.875 | 0.875 | 1.000 | - | 9 |
| 4 | C | 1 | 3 | 63 | - | 0.756 | - | - | | - | 0.578 | 0.756 | 0.578 | 10 |
| 4 | C | 2 | 1 | 99 | - | 0.375 | - | - | | - | 0.625 | - | 0.500 | 3 |

FIG. 9

Table 1000: Weighted Average Estimated Probability of HH for a given NWG_DP_BW

| BCAST_WK | NWG | DP | MAX_AVAIL_SPOTS | INDEX | # of HHs Reached | RANK | HH1 | HH2 | HH3 | HH4 | ... | HH17 | HH18 | HH19 | HH20 |
|---|---|---|---|---|---|---|---|---|---|---|---|---|---|---|---|
| 1 | A | 1 | 7 | 135 | 10 | 1 | - | 0.375 | - | 0.250 | | 0.375 | 0.500 | - | 0.750 |
| 1 | A | 2 | 6 | 78 | 8 | 20 | 0.500 | 0.350 | 0.625 | 0.425 | | 0.371 | 0.539 | 0.559 | 0.500 |
| 1 | B | 1 | 0 | 115 | 0 | 14 | 0.500 | 0.360 | - | 0.250 | | 0.399 | 0.629 | 1.000 | 0.658 |
| 1 | B | 2 | 0 | 103 | 0 | 16 | 0.500 | 0.360 | - | 0.250 | | 0.399 | 0.629 | 1.000 | 0.658 |
| 1 | C | 1 | 5 | 63 | 11 | 17 | 0.500 | 0.362 | - | 0.324 | | 0.399 | 0.579 | 0.688 | 0.573 |
| 1 | C | 2 | 4 | 99 | 8 | 9 | 0.500 | 0.358 | - | 0.250 | | 0.399 | 0.629 | 1.000 | 0.688 |
| 2 | A | 1 | 0 | 135 | 0 | 13 | 0.500 | 0.360 | - | 0.250 | | 0.399 | 0.629 | 1.000 | 0.658 |
| 2 | A | 2 | 0 | 78 | 0 | 24 | 0.500 | 0.341 | 0.625 | 0.459 | | 0.352 | 0.543 | 0.549 | 0.492 |
| 2 | B | 1 | 3 | 115 | 9 | 6 | 0.500 | 0.321 | - | 0.250 | | 0.375 | 0.661 | - | 0.750 |
| 2 | B | 2 | 0 | 103 | 0 | 15 | 0.500 | 0.360 | - | 0.250 | | 0.399 | 0.629 | 1.000 | 0.658 |
| 2 | C | 1 | 4 | 63 | 11 | 18 | 0.500 | 0.363 | - | 0.357 | | 0.399 | 0.548 | 0.598 | 0.527 |
| 2 | C | 2 | 1 | 99 | 3 | 12 | 0.500 | 0.360 | - | 0.250 | | 0.399 | 0.629 | 1.000 | 0.658 |
| 3 | A | 1 | 3 | 135 | 9 | 2 | - | 0.375 | - | 0.250 | | 0.375 | 0.500 | - | 0.750 |
| 3 | A | 2 | 3 | 78 | 8 | 22 | 0.500 | 0.340 | 0.625 | 0.458 | | 0.352 | 0.548 | 0.559 | 0.500 |
| 3 | B | 1 | 3 | 115 | 9 | 5 | 0.500 | 0.333 | - | 0.250 | | 0.375 | 0.625 | - | 0.750 |
| 3 | B | 2 | 2 | 103 | 9 | 8 | 0.500 | 0.356 | - | 0.250 | | 0.399 | 0.630 | 1.000 | 0.750 |
| 3 | C | 1 | 1 | 63 | 2 | 23 | 0.500 | 0.341 | 0.625 | 0.459 | | 0.352 | 0.543 | 0.549 | 0.492 |
| 3 | C | 2 | 1 | 99 | 3 | 11 | 0.500 | 0.359 | - | 0.250 | | 0.399 | 0.629 | 1.000 | 0.667 |
| 4 | A | 1 | 2 | 135 | 3 | 3 | - | 0.375 | - | 0.250 | | 0.375 | 0.500 | - | 0.750 |
| 4 | A | 2 | 3 | 78 | 8 | 21 | 0.500 | 0.345 | 0.625 | 0.443 | | 0.361 | 0.544 | 0.559 | 0.500 |
| 4 | B | 1 | 3 | 115 | 9 | 4 | 0.500 | 0.350 | - | 0.250 | | 0.375 | 0.575 | - | 0.750 |
| 4 | B | 2 | 3 | 103 | 9 | 7 | 0.500 | 0.344 | - | 0.250 | | 0.391 | 0.641 | 1.000 | 0.750 |
| 4 | C | 1 | 3 | 63 | 10 | 19 | 0.500 | 0.364 | - | 0.375 | | 0.399 | 0.528 | 0.559 | 0.500 |
| 4 | C | 2 | 1 | 99 | 3 | 10 | 0.500 | 0.359 | - | 0.250 | | 0.399 | 0.629 | 1.000 | 0.676 |

FIG. 10

Table 1100: Likelihood of HH watching at least F Ad Spots
where F = Ave. Min. Freq. Goal

| BCAST_WK | NWG | DP | HH1 | HH2 | HH3 | HH4 | ... | HH17 | HH18 | HH19 | HH20 | RANK |
|---|---|---|---|---|---|---|---|---|---|---|---|---|
| 1 | A | 1 | - | 0.074 | - | 0.013 | ... | 0.074 | 0.227 | - | 0.756 | 1 |
| 1 | A | 2 | 0.500 | 1.000 | 0.274 | 0.999 | ... | 0.998 | 1.000 | 0.993 | 1.000 | 20 |
| 1 | B | 1 | 0.500 | 0.998 | - | 0.158 | ... | 0.993 | 1.000 | 1.000 | 1.000 | 14 |
| 1 | B | 2 | 0.500 | 0.998 | - | 0.158 | ... | 0.993 | 1.000 | 1.000 | 1.000 | 16 |
| 1 | C | 1 | 0.500 | 1.000 | - | 0.689 | ... | 0.993 | 1.000 | 0.943 | 1.000 | 17 |
| 1 | C | 2 | 0.500 | 0.994 | - | 0.158 | ... | 0.993 | 1.000 | 1.000 | 1.000 | 9 |
| 2 | A | 1 | 0.500 | 0.998 | - | 0.158 | ... | 0.993 | 1.000 | 1.000 | 1.000 | 13 |
| 2 | A | 2 | 0.500 | 1.000 | 0.961 | 1.000 | ... | 0.999 | 1.000 | 0.995 | 1.000 | 24 |
| 2 | B | 1 | 0.500 | 0.854 | - | 0.158 | ... | 0.940 | 1.000 | - | 0.997 | 6 |
| 2 | B | 2 | 0.500 | 0.998 | - | 0.158 | ... | 0.993 | 1.000 | 1.000 | 1.000 | 15 |
| 2 | C | 1 | 0.500 | 1.000 | - | 0.918 | ... | 0.993 | 1.000 | 0.982 | 1.000 | 18 |
| 2 | C | 2 | 0.500 | 0.998 | - | 0.158 | ... | 0.993 | 1.000 | 1.000 | 1.000 | 12 |
| 3 | A | 1 | - | 0.306 | - | 0.078 | ... | 0.306 | 0.623 | - | 0.980 | 2 |
| 3 | A | 2 | 0.500 | 1.000 | 0.961 | 1.000 | ... | 0.999 | 1.000 | 0.993 | 1.000 | 22 |
| 3 | B | 1 | 0.109 | 0.769 | - | 0.158 | ... | 0.865 | 0.999 | - | 0.997 | 5 |
| 3 | B | 2 | 0.500 | 0.979 | - | 0.158 | ... | 0.993 | 1.000 | 1.000 | 0.997 | 8 |
| 3 | C | 1 | 0.500 | 1.000 | 0.961 | 1.000 | ... | 0.999 | 1.000 | 0.995 | 1.000 | 23 |
| 3 | C | 2 | 0.500 | 0.997 | - | 0.158 | ... | 0.993 | 1.000 | 1.000 | 1.000 | 11 |
| 4 | A | 1 | - | 0.490 | - | 0.158 | ... | 0.490 | 0.806 | - | 0.997 | 3 |
| 4 | A | 2 | 0.500 | 1.000 | 0.783 | 1.000 | ... | 0.999 | 1.000 | 0.993 | 1.000 | 21 |
| 4 | B | 1 | - | 0.648 | - | 0.158 | ... | 0.720 | 0.984 | - | 0.997 | 4 |
| 4 | B | 2 | 0.500 | 0.952 | - | 0.158 | ... | 0.983 | 1.000 | - | 0.997 | 7 |
| 4 | C | 1 | 0.500 | 1.000 | - | 0.976 | ... | 0.993 | 1.000 | 0.993 | 1.000 | 19 |
| 4 | C | 2 | 0.500 | 0.996 | - | 0.158 | ... | 0.993 | 1.000 | 1.000 | 1.000 | 10 |

FIG. 11

Table 1200: Likelihood of HH watching at least F Ad Spots Sorted by Rank
where F = Ave. Min. Freq. Goal

| BCAST_WK | NWG | DP | HH1 | HH2 | HH3 | HH4 | ... | HH17 | HH18 | HH19 | HH20 | RANK | # of HHs Reached (Cumulative) | Cumulative Effective Reach % | Max avail spots |
|---|---|---|---|---|---|---|---|---|---|---|---|---|---|---|---|
| 1 | A | 1 | - | 0.074 | - | 0.013 | ... | 0.074 | 0.227 | - | 0.756 | 1 | 2 | 10% | 7 |
| 3 | A | 1 | - | 0.306 | - | 0.078 | ... | 0.306 | 0.623 | - | 0.980 | 2 | 5 | 25% | 3 |
| 4 | A | 1 | - | 0.490 | - | 0.158 | ... | 0.490 | 0.806 | - | 0.997 | 3 | 8 | 40% | 2 |
| 4 | B | 1 | - | 0.648 | - | 0.158 | ... | 0.720 | 0.984 | - | 0.997 | 4 | 8 | 40% | 3 |
| 3 | B | 1 | 0.109 | 0.769 | - | 0.158 | ... | 0.865 | 0.999 | - | 0.997 | 5 | 8 | 40% | 3 |
| 2 | B | 1 | 0.500 | 0.854 | - | 0.158 | ... | 0.940 | 1.000 | - | 0.997 | 6 | 10 | 50% | 3 |
| 4 | B | 2 | 0.500 | 0.952 | - | 0.158 | ... | 0.983 | 1.000 | - | 0.997 | 7 | 10 | 50% | 3 |
| 3 | B | 2 | 0.500 | 0.979 | - | 0.158 | ... | 0.993 | 1.000 | 1.000 | 0.997 | 8 | 12 | 60% | 2 |
| 1 | C | 2 | 0.500 | 0.994 | - | 0.158 | ... | 0.993 | 1.000 | 1.000 | 1.000 | 9 | 12 | 60% | 4 |
| 4 | C | 2 | 0.500 | 0.996 | - | 0.158 | ... | 0.993 | 1.000 | 1.000 | 1.000 | 10 | 13 | 65% | 1 |
| 3 | C | 2 | 0.500 | 0.997 | - | 0.158 | ... | 0.993 | 1.000 | 1.000 | 1.000 | 11 | 13 | 65% | 1 |
| 2 | C | 2 | 0.500 | 0.998 | - | 0.158 | ... | 0.993 | 1.000 | 1.000 | 1.000 | 12 | 13 | 65% | 0 |
| 2 | A | 1 | 0.500 | 0.998 | - | 0.158 | ... | 0.993 | 1.000 | 1.000 | 1.000 | 13 | 13 | 65% | 0 |
| 1 | B | 2 | 0.500 | 0.998 | - | 0.158 | ... | 0.993 | 1.000 | 1.000 | 1.000 | 14 | 13 | 65% | 0 |
| 2 | B | 2 | 0.500 | 0.998 | - | 0.158 | ... | 0.993 | 1.000 | 1.000 | 1.000 | 15 | 13 | 65% | 0 |
| 1 | B | 1 | 0.500 | 1.000 | - | 0.689 | ... | 0.993 | 1.000 | 0.943 | 1.000 | 16 | 15 | 75% | 5 |
| 2 | C | 1 | 0.500 | 1.000 | - | 0.918 | ... | 0.993 | 1.000 | 0.982 | 1.000 | 17 | 17 | 85% | 4 |
| 4 | C | 1 | 0.500 | 1.000 | 0.274 | 0.976 | ... | 0.993 | 1.000 | 0.993 | 1.000 | 18 | 17 | 85% | 3 |
| 1 | A | 2 | 0.500 | 1.000 | 0.783 | 0.999 | ... | 0.998 | 1.000 | 0.993 | 1.000 | 19 | 18 | 90% | 6 |
| 4 | A | 2 | 0.500 | 1.000 | 0.961 | 1.000 | ... | 0.999 | 1.000 | 0.993 | 1.000 | 20 | 19 | 95% | 3 |
| 3 | A | 2 | 0.500 | 1.000 | 0.961 | 1.000 | ... | 0.999 | 1.000 | 0.993 | 1.000 | 21 | 19 | 95% | 3 |
| 2 | A | 2 | 0.500 | 1.000 | 0.961 | 1.000 | ... | 0.999 | 1.000 | 0.995 | 1.000 | 22 | 19 | 95% | 3 |
| 3 | C | 1 | 0.500 | 1.000 | 0.961 | 1.000 | ... | 0.999 | 1.000 | 0.995 | 1.000 | 23 | 19 | 95% | 1 |
| 2 | A | 2 | 0.500 | 1.000 | 0.961 | 1.000 | ... | 0.999 | 1.000 | 0.995 | 1.000 | 24 | 19 | 95% | 0 |

FIG. 12

Table 1300: Media Plan Selections

| BCAST_WK | NWG | DP | MAX_AVAIL_SPOTS | SPOT_PLAN | AVG_QTR_HR_IMPR |
|---|---|---|---|---|---|
| 1 | A | 1 | 7 | 7 | 28 |
| 1 | A | 2 | 6 | 0 | 0 |
| 1 | B | 1 | 0 | 0 | 0 |
| 1 | B | 2 | 0 | 0 | 0 |
| 1 | C | 1 | 5 | 5 | 20 |
| 1 | C | 2 | 4 | 4 | 12 |
| 2 | A | 1 | 0 | 0 | 0 |
| 2 | A | 2 | 0 | 0 | 0 |
| 2 | B | 1 | 3 | 3 | 12 |
| 2 | B | 2 | 0 | 0 | 0 |
| 2 | C | 1 | 4 | 4 | 16 |
| 2 | C | 2 | 1 | 1 | 3 |
| 3 | A | 1 | 3 | 3 | 12 |
| 3 | A | 2 | 3 | 0 | 0 |
| 3 | B | 1 | 3 | 3 | 12 |
| 3 | B | 2 | 2 | 2 | 10 |
| 3 | C | 1 | 1 | 0 | 0 |
| 3 | C | 2 | 1 | 1 | 3 |
| 4 | A | 1 | 2 | 2 | 8 |
| 4 | A | 2 | 3 | 0 | 0 |
| 4 | B | 1 | 3 | 3 | 12 |
| 4 | B | 2 | 3 | 3 | 15 |
| 4 | C | 1 | 3 | 0 | 0 |
| 4 | C | 2 | 1 | 1 | 3 |

FIG. 13

REACH AND FREQUENCY ESTIMATOR

CROSS-REFERENCE TO RELATED APPLICATIONS

This application is a continuation of U.S. application Ser. No. 15/173,246, filed on Jun. 3, 2016, entitled, System and Method for Reach and Frequency Estimator, which is incorporated herein by reference in its entirety.

BACKGROUND

Field

Embodiments generally relate to cable networks and more specifically to media planning in a cable system.

Background Art

Cable system operators currently sell network/daypart ad spots to customers according to a day and time without knowing how many households will see the ad spots and how often.

BRIEF DESCRIPTION OF THE DRAWINGS/FIGURES

FIG. 2A-2B illustrate an example of a conventional approach.

FIG. 3 illustrates an example of viewership data according to an embodiment.

FIG. 4 illustrates an example of a number of impressions per distinct household (HH) according to an embodiment.

FIG. 6 illustrates a number of impressions for each HH watching a given network, daypart, broadcast week (NWG_DP_BW) according to an embodiment.

FIG. 7 illustrates an estimated probability for each HH watching a given NWG_DP_BW according to an embodiment.

FIG. 8 illustrates an example of inventory according to an embodiment.

FIG. 9 illustrates a likelihood of a HH watching 1 Ad Spot based on inventory for a given NWG_DP_BW according to an embodiment.

FIG. 10 illustrates a weighted average probability for each HH for a given NWG_DP_BW according to an embodiment.

FIG. 11 illustrates a likelihood of a HH watching at least F Ad Spots, where F is the minimum frequency goal, according to an embodiment.

FIG. 12 illustrates a likelihood of a HH watching at least F Ad Spots sorted by rank, where F is the minimum frequency goal, according to an embodiment.

FIG. 13 illustrates media plan selections according to an embodiment.

DETAILED DESCRIPTION OF EMBODIMENTS

Embodiments utilize viewership data collected via a set top box (STB) at individual households (HHs) to enable a network operator to recommend ad spots to customers based on a percentage of HHs that are likely to view the ad spots (e.g., the % of HHs reached by the ad spots), and/or based on the average number of times (e.g., average frequency) that the reached HHs, are likely to view the ad spot. Embodiments compile the available network/daypart ad spots per broadcast week, and determine a number of ad spots for each network/daypart that satisfy a reached threshold of HHs, and/or satisfies the minimum frequency threshold. Another embodiment utilizes the output of an integrated media planning tool that determines a number of ad spots available for purchase, and determines the % of HHs likely reached by the ad spots as well as an average frequency that those HHs are likely to view the ad spots.

Figure 1:
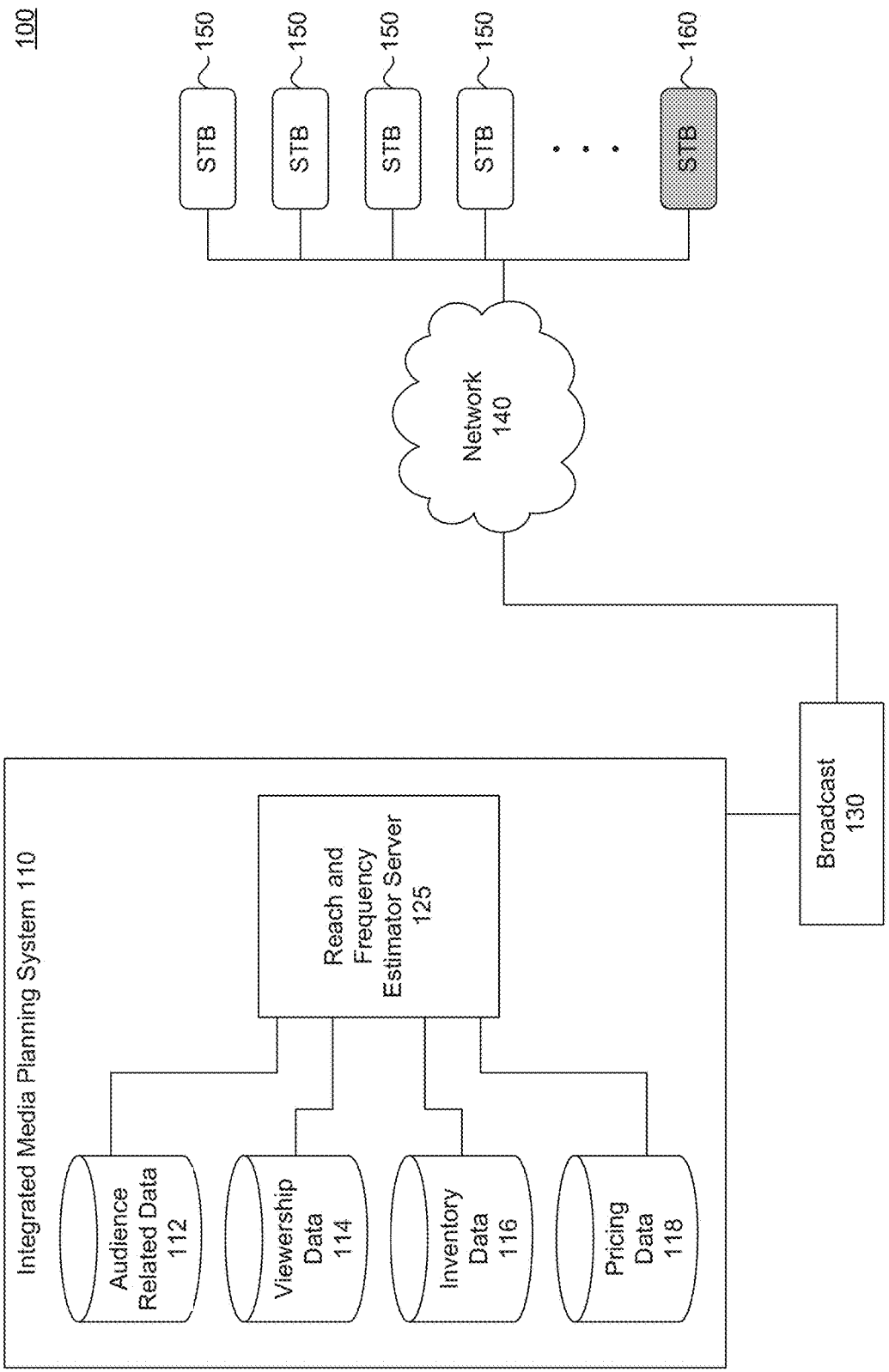
FIG. 1 illustrates an example system according to an embodiment.
Figure 14:
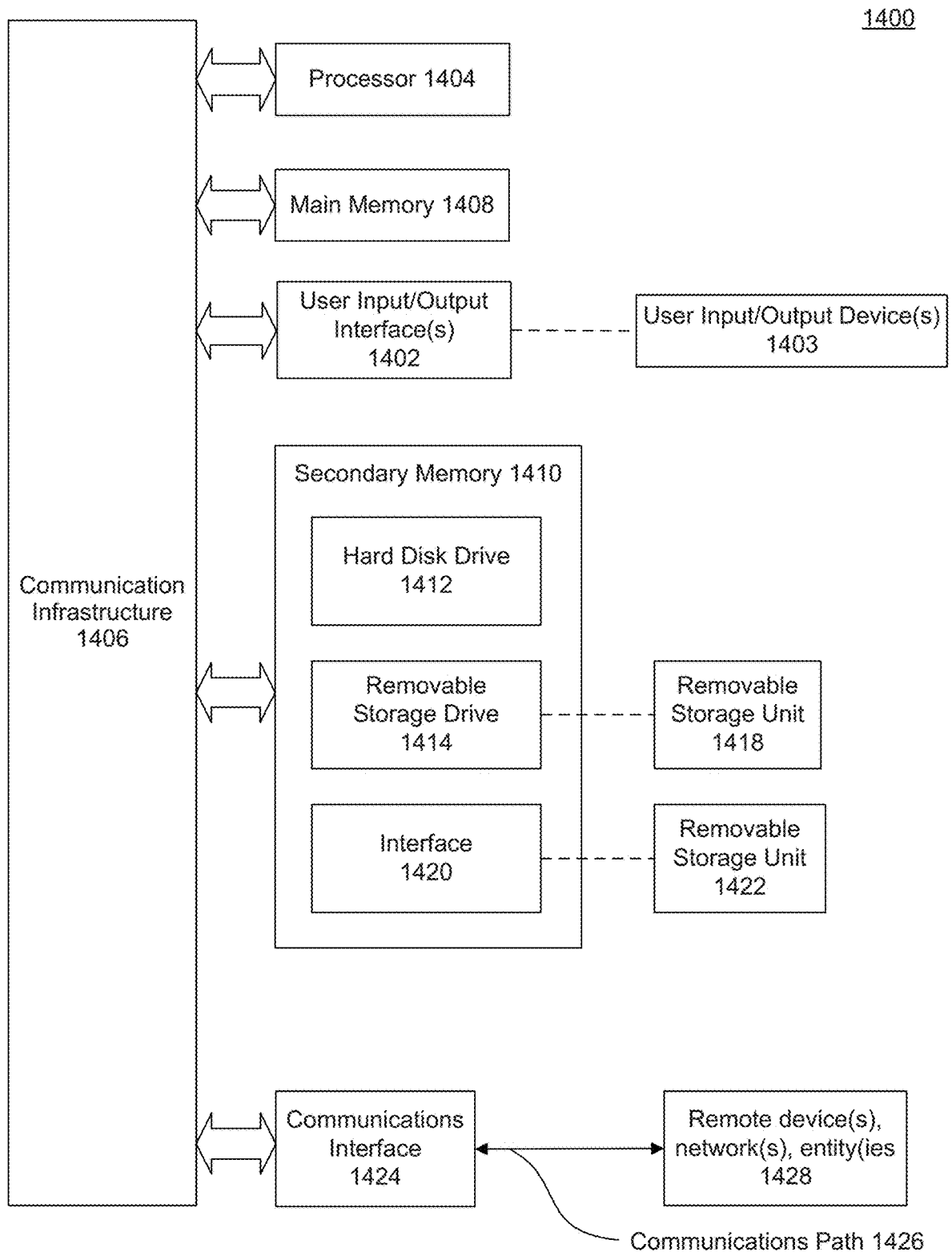
FIG. 14 illustrates allocations an example computer system which can be used to implement an embodiment.

The following sections are organized as follows: An example system according to an embodiment is presented (FIG. 1). An example of a conventional approach and associated limitations (FIGS. 2A and 2B). Examples according to an embodiment are described (FIGS. 3 and 4). A method according to an embodiment (FIG. 5) and aspects of the method according to an embodiment are described (FIGS. 6-13). An example computer system which may be used to implement an embodiment is then described (FIG. 14).

FIG. 1 illustrates an example system 100 according to an embodiment. System 100, which may be a cable system, includes a variety of network elements and transport networks that together support a variety of services including but not limited to television and video services, content on demand services, Internet access, and/or Voice over Internet Protocol (VoIP) services. System 100 includes a service operator network that is associated with customer accounts associated with network elements including but not limited to set top boxes (STBs), digital video recorders (DVRs), or On-Device Portals (ODPs). As an example, FIG. 1 includes STB 150 and STB 160. A STB 150 may be associated with a household, or a single household may include more than one STB 150. A service operator network may provide services to one or more business markets and STB 160 may be in a different business market than STB 150.

A service operator network may be coupled to STB 150 and STB 160 via network 140 which may be the internet and/or include network transport and network elements such as a high speed transport network and a node, or a passive optical network (PON), and/or an optical network unit (ONU). The service operator network may include broadcast 130 such as a broadcast head-end that may receive, process, and distribute media (e.g., television, video, voice, and/or Internet access services).

Broadcast 130 may be coupled to integrated media planning system 110 that includes reach and frequency estimator server 125 coupled to audience-related data source 112, viewership data source 114, inventory data source 116, and pricing data source 118. A data source may be any type of structured data store, including a relational database, for example. Audience-related data may include demographics (e.g., age, gender, income level, and number of children) associated with a household as well as behavioral data such as propensity data (e.g., likely to travel, likely to purchase an automobile). Viewership data includes historical viewership data that indicates, for example, interest in sports, news, food/cooking, history, and/or documentaries. An example system and technique of collecting viewership data is in U.S. patent application Ser. No. 13/833,293, filed on Mar. 15, 2013, entitled Optimizing Inventory Based on Predicted Viewership, which is incorporated herein by reference in its entirety.

A network group (e.g., American Broadcast Channel (ABC), Cable News Network (CNN)) may include networks with different broadcasting formats (e.g., high definition (HD), standard definition (SD). For example, a network group (NWG) may be CNN, while one network may be CNN-HD and another network may be CNN-SD.

Pricing data includes rate information such as the cost for an ad spot. For example, an ad spot may be for a particular network group/daypart (NWG_DP) combination and/or a particular network/daypart (NW_DP) combination. A network group (e.g., ABC, CNN) or a network (e.g., ABC-HD, CNN-SD) typically divides a day into portions or dayparts (e.g., 6 am-10 am, 10 am-3 pm) to direct programming to a particular demographic and target audience. A NWG_DP is a combination of a network group and a daypart (e.g., ABC, 6 am-10 am), and a NW_DP is a combination of a network and a daypart (e.g., CNN-HD, 6 am-10 am). Thus, pricing data may indicate a rate for each network group/daypart combination and/or a rate for each network/daypart combination. Inventory data may include the number of ad spots or advertisement spaces or openings of variable length (e.g., a minute or half-minute) that are available during various NWG_DPs and/or NW_DPs. As a convenience and not a limitation, examples herein address NWG_DPs.

In an embodiment, an ad spot may be associated with content on demand that may not be associated with a network, network group, or a daypart. Content on demand may include but is not limited to video content (e.g., movies, TV shows, trailers), gaming content, audio content (e.g., radio broadcasts), print content (e.g., magazines, newspapers, books), and/or on-line content (e.g., social media, blogs, uploaded video). An ad spot may be associated with a configurable time or percentage associated with a content on demand (e.g., the first 15 minutes, the second 15 minutes, or the first 25% time period of the content on demand). Further, the configurable time or percentage may be periodic (e.g., every 15 minutes or each 25% time period). In addition, the duration of an ad spot may be variable.

Reach and frequency estimator server 125 may be implemented on one or more computing devices having server capabilities. Such a computing device may include, but is not limited to, a device having a processor and memory, including a non-transitory memory, for executing and storing instructions. The memory may tangibly embody the data and program instructions. Software may include one or more applications and an operating system. Hardware may include but is not limited to, a processor, memory, and graphical user interface (GUI) display. The computing device may also have multiple processors and multiple shared or separate memory components. For example, the computing device may be a part of or the entirety of a clustered computing environment or server farm.

In an embodiment, reach and frequency estimator 125 may include functions of or work in conjunction with an integrated media planning tool as described in U.S. patent application Ser. No. 14/615,793, filed on Feb. 6, 2015, entitled System and Method for Integrated Media Planning, which is incorporated herein by reference in its entirety.

FIGS. 2A-2B illustrate an example of a conventional approach. Conventional approaches to allocating ad spots may use past viewership data of aggregated households (HHs) as the basis for allocating ad spots. FIG. 2A illustrates an example 210 of viewership data of aggregated HHs for a given NWG_DP combination on one day (e.g., day 1), over quarter hour intervals.

Assume for example, that two ad spots may be placed at a later date (e.g., day 2): Ad spot 1 placed at time 22:13:44 and Ad spot 2 at time 22:25:30. Note that day 2 may be anytime later such as a day, week, month, etc. The conventional viewership data are used in aggregate and not at a HH level, thus, determining how many unique HHs saw an ad, and whether a HH saw one or both ad spots is not known. As shown in FIG. 2B, using the past viewership of aggregated HHs, a network operator cannot determine how many unique HHs would view Ad spot for Ad spot 2 on day 2, let alone how frequently each ad would be viewed by a HH.

FIG. 3 illustrates an example 300 of viewership data at according to an embodiment. Using STB data, a network operator may identify a population of HHs, and analyze past viewership data at an individual HH level to determine when to place an ad in the future. For example, reach and frequency estimator server 125 may obtain STB data from viewership data 114 at an individual HH level. Embodiments include accessing STB data at an individual HH level from one or more databases for a population, and utilizing STB data to calculate a probability of the individual HH watching TV at a particular time. Example 300 illustrates a calculated probability of viewership data at an individual HH level for a given NWG_DP for a given day (e.g., day 1). There are six different HHs in the population of HHs, HHA-HHF. The probability of viewing that NWG_DP for two different quarter hours are shown in the last column. For example, HHA has a 40% probability of watching TV, in this case the given NWG_DP for the time slot 22:00:00-22:14:59, and a 50% probability of watching time slot 22:15:00-22:29:59. HHB has a 20% probability of viewing NWG_DP for the time slot 22:00:00-22:14:59 and an 80% probability of viewing the time slot 22:15:00-22:29:59, and so on.

A reach threshold is a configurable parameter that when satisfied, is used to determine that a HH has watched a time slot, or made an impression. An impression is a measurement of viewership. An impression represents a household that is tuned to a program for a given amount of time in an average time period, (e.g., an impression may be an average quarter hour impression or an average commercial minute impression). In an embodiment, an impression is a HH that is reached in an average quarter hour. In an embodiment, an impression is a number. In another example, an average quarter hour impression may be defined as a household tuned to at least five minutes for a given program and/or type of program in a quarter hour. One having skill in the relevant art(s) will understand that other measures of viewership are possible.

When a probability of watching the given NWG_DP for a time slot satisfies a reach threshold, then the household is considered "reached". Satisfying may include meeting, exceeding, being below, and/or being within a range of the reach threshold, depending on the configuration of the reach threshold value. In example 300, the reach threshold is for example, set to 40%, and satisfying the reach threshold includes meeting or exceeding 40%. Accordingly, HHA is considered reached twice, once in each of the time slots because the probability of viewing the NWG_DP satisfies the reach threshold of 40%.

Assume for example, that two ad spots may be placed at a later date (e.g., day 2): Ad spot 1 placed at time 22:13:44 and Ad spot 2 at time 22:25:30. Note that day 2 may be anytime later such as a day, week, month, etc. Based on the past viewership of HHA, HHA is counted as watching TV during each of those time slots. Therefore, if Ad 1 and Ad spot 2 were placed in the respective time slots in the future, HHA would be counted in a prediction of viewing Ad spot 1 during the first time slot, and Ad spot 2 during the second time slot. In example 300, four unique HHs, HHA, HHB, HHC, and HHE, are reached because at least one of their probabilities for a time slot satisfies the reach threshold of 40%: HHA at 40% and 50%; HHB at 80%; HHC at 60%; and HHE at 50% and 40%.

In another example, a network operator may use STB data to identify a segment of a population of HHs (e.g., identify a segment of the total HH population based on targeted audience-related criteria), and analyze past viewership data at an individual HH level for the segment population of HHs to determine when to place an ad in the future. For example, a client may want to direct advertisements to a segment of the population comprised of HHs based on targeted audience-related criteria (e.g., HHs with incomes greater than $30,000, HHs with pets, and HHs interested in viewing news). Reach and frequency estimator 125 may access audience-related data in database 112.

FIG. 4 illustrates an example 400 of a number of impressions per distinct household (HH) according to an embodiment. Based on example 300, where Ad spot 1 is placed at time 22:13:44 and Ad spot 2 at time 22:25:30, HHA is counted as being reached twice (e.g., two impressions: viewing Ad 1 in the first time slot and viewing Ad spot 2 in the second time slot). HHB and HHC were reached once, and each had one impression, and HHE was reached twice (e.g., two impressions). The average frequency with which the HHs in the population that view at least one ad, may be calculated as follows:

$$\text{Average Frequency} = \frac{\sum (\text{\# impressions of the population})}{\text{Total no. of unique } HHs \text{ of a population that view an ad spot}}$$

The average frequency is the total number of impressions the HHs that were reached is 6 (e.g., 2+1+1+2) divided by the total number of reached HHs which is 4 (e.g., HHA, HHB, HHC, and HHE). Accordingly, the average frequency is 1.5 (e.g., 6/4). Accordingly, if Ad spot 1 and Ad spot 2 were placed in their respective time slots in the future, a network operator could calculate that four unique HHs would view Ad spot 1 and Ad 2, and that each of those unique HHs would view one of those ad spots an average of 1.5 times.

In an embodiment, a network operator can determine which unique HH viewed a particular ad spot. A network operator could determine how many times an ad spot is considered viewed. Based on example 300 and example 400, of those 6 impressions, Ad spot 1 would be viewed three times (e.g., during 22:00:00-22:14:14:59) and Ad spot 2 would be viewed three times (e.g., during 22:15:00-22:29:59).

A reach percentage may be defined as follows:

$$\text{Reach Percentage (\%)} = \frac{\text{No. of distinct } HHS \text{ of a population that view an ad spot}}{\text{Total no. of } HHs \text{ of a population}}$$

Since four distinct or different HHs out of a total of six HHs of the population are reached, a reach percentage of all the HHs is 66.6% (e.g., (4 distinct HHs reached)/(6 HH of the population).)

In another example, a network operator may focus on a segment of the population that satisfy targeted audience-related criteria, and analyze past viewership data at an individual HH level for the segment population of HHs to determine when to place an ad spot in the future. As a convenience and not a limitation, examples herein address populations, but the examples may also apply to segment populations.

An effective average frequency may be calculated as follows:

$$\text{Effective Average Frequency} = \frac{\sum (\text{\# impressions of the population})}{\text{Total no. of unique } HHs \text{ of a population that view an ad spot}}$$

An effective reach percentage may be defined as follows:

$$\text{Effective Reach Percentage (\%)} = \frac{\text{No. of distinct } HHS \text{ of a population that view an ad spot}}{\text{Total no. of } HHs \text{ of a population}}$$

Figure 5:
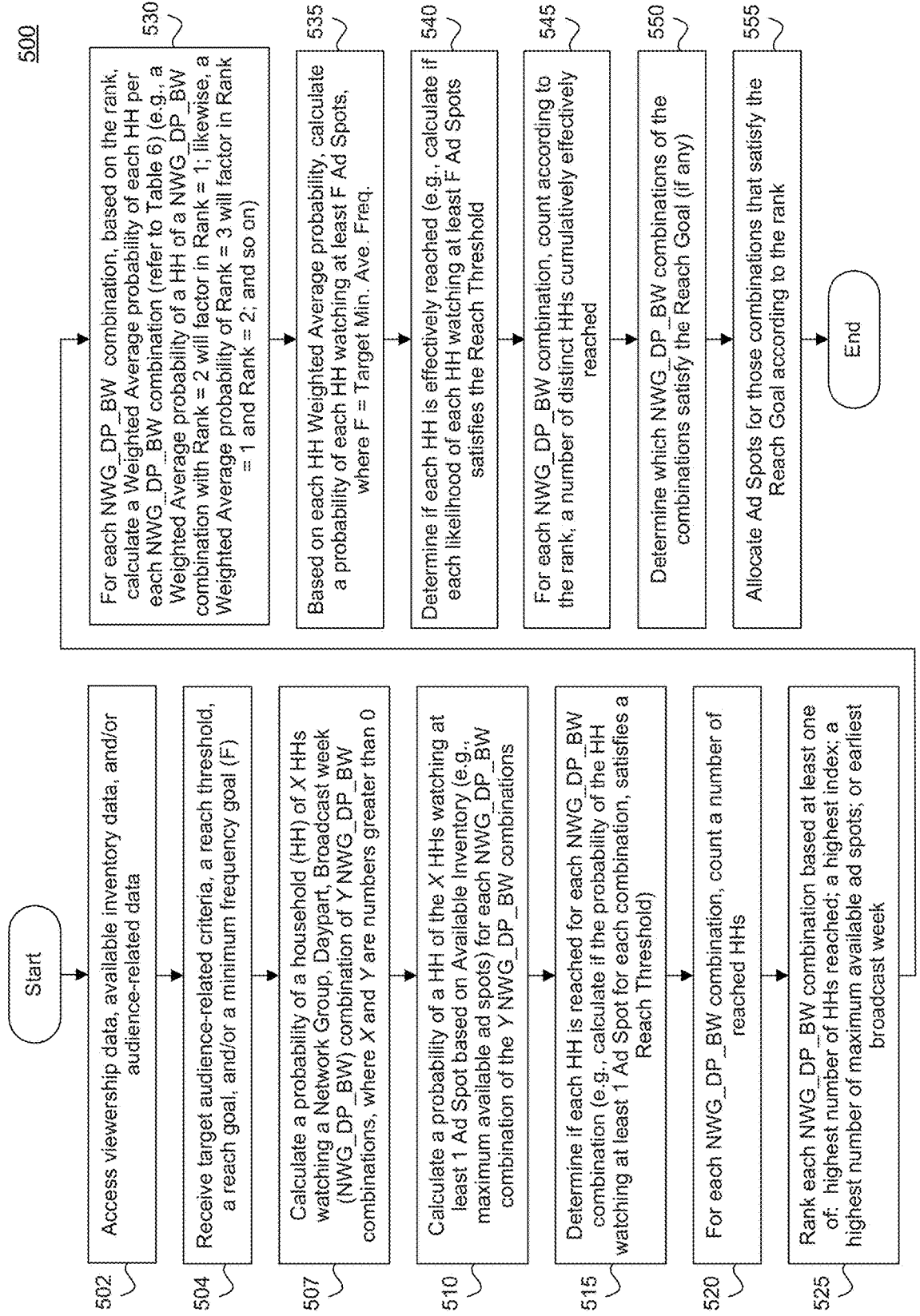
FIG. 5 illustrates a method for reach and frequency estimation according to an embodiment.

FIG. 5 illustrates a method 500 for reach and frequency estimation according to an embodiment. As a convenience and not a limitation, method 500 may be described using elements of system 100 of FIG. 1. For example, method 500 may be performed by reach and frequency estimator server 125, and data may be obtained from one or more databases 112-118.

Embodiments include calculating an estimated overall reach percentage and average frequency for each media plan generated by reach and frequency estimator server 125, or in conjunction with an integrated media planning tool (not shown). As an example, reach and frequency estimator server 125 calculates a probability that a HH will tune to a specific network group, daypart combination on each media plan based on past viewership data, and the number of ad spots planned against that network group, daypart combination in the future. Reach and frequency estimator server 125 may use the average actual or predicted quarterly hour impressions for each HH to provide a proxy for the probability of the HH watching a given network group, daypart combination. Reach and frequency estimator server 125 may use a binomial distribution to calculate the probability of the HH watching at least 1 ad spot for N ad spots, where N is equal to a maximum number of ad spots allocated in a media plan for a network group, daypart combination. Reach and frequency estimator server 125 may use a configurable reach threshold in an algorithm to determine if an individual HH is included in a number of HHs reached. Reach and frequency estimator server 125 may also determine a number of times (e.g., a number of impressions) each of the HHs is estimated to be reached, and/or determine an average minimum frequency of the ad spot distribution.

In another embodiment, a user may enter campaign characteristics such as: a reach threshold, a reach percentage goal, and a minimum frequency (F) as a goal. Reach and frequency estimator server 125 may select a network group, daypart combination and determine which HHs have a probability that satisfies the reach threshold, and count only those HHs towards the reach percentage goal. Reach and frequency estimator server 125 may use a similar method to determine the average minimum frequency that those HHs are most likely to be counted. Reach and frequency estimator server 125 may allocate ad spots to satisfy an reach percentage goal and/or a minimum frequency (F) goal.

In another embodiment, reach and frequency estimator server 125 may utilize target-audience-related data to identify a segment population of the total population that meets certain criteria. Reach and frequency estimator server 125 may determine an effective average minimum frequency as well as an effective reach percentage.

Method 500 begins at step 502.

At step 502, reach and frequency estimator server 125 may access one or more databases to access viewership data 114, available inventory data from inventory data 116, and/or audience-related data 112.

At step 504, reach and frequency estimator server 125 may receive target audience-related criteria, a reach threshold, a reach percentage goal, and/or a minimum frequency goal (F). For example, a user may enter campaign goal data including target audience-related criteria such as a certain income level, interest in traveling, HHs with pets. A reach threshold may be set at 40%, a reach percentage goal may be set at 80%, and a minimum frequency goal may be set to 5.

FIG. 6 illustrates a number of impressions for each HH according to an embodiment. As an illustration, and not a limitation, the example includes a total population of 20 HHs. Four broadcast weeks (BW) are shown: BW1-BW4. The network groups (NWGs) are A, B, and C, the dayparts (DPs) are 1 and 2. In this example, the viewership data includes 2 hours (or 8 quarter hours) of data per day for each NWG_DP. FIG. 6 shows viewership data for 24 NWG_DP_BW combinations for a month (e.g., 28 days), or 224 quarter hours (e.g., 8 quarter hours/day×28 days).

For each combination of NWG_DP_BW for a month (e.g., each row in FIG. 6), the number of actual or predicted quarter hour impressions per HH are shown. For NWG A_DP1_BW1, for example, HH1, had no impressions (e.g., HH1 is counted as not having watched NWG A_DP1 during BW1, and HH2 had 84 impressions (e.g., HH2 is counted as having watched NWG A_DP1 84 times during BW1. At NWG A_DP1_BW3, HH20 had 168 impressions (e.g., HH20 is counted as having watched NWG A_DP1 168 times during BW3. At NWG B_DP1_BW4, HH17 had 84 impressions (e.g., HH17 is counted as having watched NWG B_DP1 84 times during BW4.

At step 507, reach and frequency estimator server 125 may calculate a probability of a household (HH) of X HHs (e.g., X HHs=20 HHs) watching a Network Group, Daypart, Broadcast week (NWG_DP_BW) combination of Y NWG_DP_BW (e.g., Y NWG_DP_BW combinations=24 NWG_DP_BW) combinations, where X and Y are numbers greater than 0. For example, reach and frequency estimator server 125 may calculate a probability of a HH of the 20 HHs watching a given NWG_DP_BW combination, $P_{HH\_DP\_NWG}$. The probability is the average actual or predicted quarterly hour impressions for each HH that provides a proxy for the probability of the HH being reached (e.g., watching a given NWG_DP_BW):

$$P_{HH\_DP\_NWG} = \frac{\text{\# of actual or predicted quarter hour impressions for a } NWG\_DP\_BW}{\text{\# of quarter hours in } DP}$$

FIG. 7 illustrates an estimated probability for a HH watching a given network group (e.g., the probability of being reached), daypart, broadcast week (NWG_DP_BW) according to an embodiment. The probability of a HH being reached is calculated as described above (e.g., $P_{HH\_DP\_NWG}$). For NWG A_DP1_BW1, for example, HH1, had no impressions therefore the probability is zero, and HH2 has a 37.5% probability of being reached (e.g., 84 impressions/224 quarter hours). At NWG A_DP1_BW3, HH20 has a 75% probability of being reached (e.g., 168 impressions/224 quarter hours). At NWG B_DP1_BW4, HH17 has a 37.5% probability of being reached (e.g., 84 impressions/224 quarter hours).

At step 510, reach and frequency estimator server 125 may calculate a probability, $P_{HH\_WTCH\_ATLEAST\_1\_SPOT}$, of a HH of the X HHs watching at least 1 Ad Spot based on Available Inventory (e.g., maximum available ad spots) for each NWG_DP_BW combination of the Y NWG_DP_BW combinations. In an example, X may be 20 (e.g., 20 HHs in the population) and Y may be 24 (e.g., 24 NWG_DP_BW combinations).

FIG. 8 illustrates an example of inventory according to an embodiment. For example, NWG A_DP1_BW1, for example, there may be a capacity of 20 ad spots, 10 are already sold, and 10 are available. At NWG A_DP1_BW3, there may be a capacity of 20 ad spots, 13 are already sold, and 7 are available. At NWG B_DP1_BW4, there may be a capacity of 20 ad spots, 16 are already sold, and 4 remain available. At NWG B_DP1_BW4, there may be a capacity of 20 ad spots, 15 are already sold, and 5 remain available. Of those ad spots that remain available, algorithms may be applied to determine a maximum number of available ad spots, N, typically less than the number of ad spots that remain available.

The probability, $P_{HH\_WTCH\_ATLEAST\_1\_SPOT}$, may be based at least on $P_{HH\_DP\_NWG}$, calculated as follows:

$$P_{HH\_WTCH\_ATLEAST\_1\_SPOT} = 1-(1-P_{HH\_DP\_NWG})^N,$$
where $N$ is a maximum number of ad spots allocated in a plan for a NWG_DP_BW combination.

FIG. 9 illustrates a likelihood of a HH watching 1 Ad Spot based on inventory for a given NWG_DP_BW according to an embodiment. The MAX_AVAIL_SPOTS column indicates the maximum number of spots that are available for each NWG_DP_BW combination. For NWG A_DP1_BW1, for example, there may be 7 maximum available ad spots of the 10 available ad spots (from FIG. 8). Although 10 are available, algorithms may be applied to determine a maximum number of available ad spots as 7 of the available 10 ad spots. The $P_{HH\_WTCH\_ATLEAST\_1\_SPOT}$ may be calculated for HH2 using the respective $P_{HH\_DP\_NWG}$ as shown in FIG. 7 as follows:

$$P_{HH2\_WTCH\_ATLEAST\_1\_SPOT} = 1-(1-0.375)^7 = 96.3\%$$

Accordingly, based on the ranking, there is a 96.3% chance that HH2 will watch one of the 7 maximum available ad spots of NWG A_DP1 during broadcast week 1.

At NWG A_DP1_BW3, there may be a maximum of 3 available ad spots of the 4 available, and the $P_{HH\_WTCH\_ATLEAST\_1\_SPOT}$ may be calculated for HH20 as follows:

$$P_{HH20\_WTCH\_ATLEAST\_1\_SPOT} = 1-(1-0.750)^3 = 98.4\%$$

Accordingly, based on the ranking, there is a 98.4% chance that HH20 will watch one of the 3 maximum available ad spots of NWG A_DP1 during broadcast week 3.

At NWG B_DP1_BW4, there may be a maximum of 3 available ad spots of the 5 available, and the $P_{HH\_WTCH\_ATLEAST\_1\_SPOT}$ may be calculated for HH17 as follows:

$P_{HH17\_WTCH\_ATLEAST\_1\_SPOT}=1-(1-0.375)^3=75.6\%$

Accordingly, based on the ranking, there is a 75.6% chance that HH17 will watch one of the 3 maximum available ad spots of NWG B_DP1 during broadcast week 4.

At step 515, reach and frequency estimator server 125 may determine if each HH is reached for each NWG_DP_BW combination Assuming a reach threshold of 40%, each of the $P_{HH\_WTCH\_ATLEAST\_1\_SPOT}$ is compared with the reach threshold to determine if the reach threshold is satisfied. For NWG A_DP1_BW1, for example, $P_{HH2\_WTCH\_ATLEAST\_1\_SPOT}=96.3\%$ which satisfies the reach threshold of 40% so HH2 is considered reached as well as HH4 (86.7%), HH17 (96.3%), HH18 (99.2%), and HH20 (100%). The number of HHs that satisfy the reach threshold for NWG A_DP1_BW1 is 10. Note that five other HHs not shown in FIG. 9 also satisfied the reach threshold and contribute to the 10 HHs reached.

NWG A_DP1_BW3, for example, $P_{HH20\_WTCH\_ATLEAST\_1\_SPOT}=98.4\%$ which satisfies the reach threshold of 40% so HH20 is considered reached as well as HH2 (75.6%), HH4 (57.8%), HH17 (75.6%) and HH18 (87.5%). The number of HHs that satisfy the reach threshold for NWG A_DP1_BW3 is 9. Note that four other HHs not shown in FIG. 9 also satisfied the reach threshold and contribute to the 9 HHs reached.

For NWG B_DP1_BW4, for example, $P_{HH17\_WTCH\_ATLEAST\_1\_SPOT}=75.6\%$ which satisfies the reach threshold of 40% so HH17 is considered reach as well as HH1 (87.5%), HH2 (57.8%), and HH18 (99.8%). The number of HHs that satisfy the reach threshold for NWG B_DP1_BW4 is 9. Note that five other HHs not shown in FIG. 9 also satisfied the reach threshold and contribute to the 9 HHs reached.

At step 520, for each NWG_DP_BW combination, reach and frequency estimator server 125 may count a number of reached HHs as shown in the last column of FIG. 9. As described above, NWG A_DP1_BW1 reaches 10 HHs, NWG A_DP1_BW3 reaches 9 HHs, and NWG B_DP1_BW4 reaches 9 HHs.

The index column of FIG. 9, is determined as a segment's percentage share of the NWG_DP_BW's total impressions divided by a benchmark percentage, which is the segment's overall percentage share of all the NWG_DP_BW's impressions in the selected business market, multiplied by 100. In other words, an index is defined as shown below:

$$\text{Index} = \frac{\text{Segment's \% share of the total impressions}}{\text{Benchmark \%}},$$

where $$\text{Segment's \% share of the total impressions} = \frac{\text{No. of average quarter hour segment impressions for a } NWG\_DP}{\text{No. of average quarter hour segment impressions for all } NWG\_DPs}$$

$$\text{Benchmark \%} = \frac{\text{No. of average quarter hour impressions of the total population for a } NWG\_DP}{\text{No. of average quarter hour impressions of the total population for all } NWG\_DPs}$$

At step 525, reach and frequency estimator server 125 may rank each NWG_DP_BW combination based on at least one of: highest number of HHs reached; a highest index; a highest number of maximum available ad spots; or earliest broadcast week (BW). In addition, the 24 NWG_DP_BW combinations may be ranked according to highest number of HHs reached, a highest index, a highest number of maximum available ad spots, and/or earliest broadcast week (BW). The example above is not a limitation. A different order of priorities for the factors may be used and/or different types of factors may be used to determine the rank of the 24 NW_DP_BW combinations.

At step 530, for each NWG_DP_BW combination, based on the rank, reach and frequency estimator server 125 may calculate a weighted average probability of each HH per each NWG_DP_BW combination (e.g., a weighted average probability of a HH of a NWG_DP_BW combination with Rank=2 will factor in Rank=1; likewise, a weighted average probability of Rank=3 will factor in Rank=1 and Rank=2; and so on). The weighted average probability for a HH, $P_{HH}$, may be calculated as follows:

$P_{HH}=\Sigma(P_{HH\_DP\_NWG}*N)$, where N is the maximum number of ad spots allocated in a plan for a NWG_DP_BW combination.

FIG. 10 illustrates a weighted average for each HH for a given NWG_DP_BW according to an embodiment. A weighted average probability for NWG A_DP1_BW1, HH2 may be calculated using the respective $P_{HH\_DP\_NWG}$ shown in FIG. 7:

Weighted Average $P_{HH2}=37.5\%$.

For NWG A_DP1_BW3, HH20 may be calculated as follows:

Weighted Average $P_{HH20}=75.0\%$

And, for NWG B_DP1_BW4, HH 17 may be calculated as:

Weighted Average $P_{HH17}=37.5\%$

For example, a weighted average probability for HH17 for NWG B_DP2 BW4 which is ranked 7 may be calculated based on the earlier rankings as follows:

| Rank | Max. Available Ad Spots | $P_{HH17\_DP\_NWG}$ (See FIG. 7) |
|---|---|---|
| 1 | 7 | 0.375 |
| 2 | 3 | 0.375 |
| 3 | 2 | 0.375 |
| 4 | 3 | 0.375 |
| 5 | 3 | 0.375 |
| 6 | 3 | 0.375 |
| 7 | 3 | 0.500 |

The weighted average of HH17 of NWG B_DP2 BW4, is shown as $$P_{HH17} = \frac{7*0.375 + 3*0.375 + 2*0.375 + 3*0.375 + 3*0.375 + 3*0.500}{7+3+2+3+3+3+3}$$

At step 535, based on each HH Weighted Average probability, $P_{HH}$, reach and frequency estimator server 125 may calculate $P_{HH\_WTCH\_ATLEAST\_F\_SPOTS}$, a probability of each HH watching at least F Ad Spots, where F=F is the minimum frequency goal as entered by a user follows:

$$P_{HH\_WTCH\_ATLEAST\_F\_SPOTS} = 1 - \sum \frac{N!}{(N-F)! * F! * (P_{HH}{}^{F}) * (1-P_{HH})^{N-F}},$$

where N is the maximum number of available ad spots and F is the minimum frequency goal.

FIG. 11 illustrates a likelihood of a HH watching at least F Ad Spots based on inventory order by rank, where F is the minimum frequency goal, according to an embodiment. In the example where F=5, for example NWG A_DP1_BW1, HH2, $P_{HH2\_WTCH\_ATLEAST\_F\_SPOTS}$=7.4%. Accordingly, there is a 7.4% chance that HH2 will watch at least 5 of the 7 maximum available ad spots of NWG A_DP1 during broadcast week 1.

NWG A_DP1_BW3, HH20, $P_{HH20\_WTCH\_ATLEAST\_F\_SPOTS}$=98.0%. There is a 98% chance that HH20 will watch 3 of the 3 maximum available ad spots of NWG A_DP1 during broadcast week 3.

And, for NWG B_DP1_BW4, HH17, $P_{HH17\_WTCH\_ATLEAST\_F\_SPOTS}$=72.0%. There is a 72% chance that HH17 will watch 3 of the 3 maximum available ad spots of NWG B_DP1 during broadcast week 4.

At step 540, reach and frequency estimator server 125 may determine if each HH is effectively reached (e.g., calculate if each likelihood of each HH watching at least F Ad Spots satisfies the reach threshold. For NWG A_DP1_BW1, HH2, for example, $P_{HH2\_WTCH\_ATLEAST\_F\_SPOTS}$=7.4%, and does not satisfy the reach threshold of 40%. Accordingly, HH2 is not considered as a reached household for this network group, daypart combination. For NWG A_DP1_BW3, HH20 $P_{HH20\_WTCH\_ATLEAST\_F\_SPOTS}$=98.0%, thus HH20 satisfies the reach threshold of 40% and is considered a reached household for this network group, daypart combination. Because HH20 also satisfies the minimum frequency goal F, HH20 is considered an effectively reached household. And, for NWG B_DP1_BW4, HH17, $P_{HH17\_WTCH\_ATLEAST\_F\_SPOTS}$=72.0%. HH17 is considered an effectively reached household for this network group, daypart combination because 72% satisfies the reach threshold and the minimum frequency goal F.

At step 545, reach and frequency estimator server 125 may count according to the rank, a number of distinct HHs cumulatively effectively reached for each NWG_DP_BW combination as described above. FIG. 12 illustrates a likelihood of a HH watching at least F Ad Spots sorted by rank, where F is the minimum frequency goal, according to an embodiment. FIG. 11 is sorted according to rank to produce FIG. 12. The ranking of each network group, daypart broadcast week is shown in a column followed by the number of HHs cumulatively effectively reached. NWG A_DP1_BW1 is ranked first. Although HH2 does not satisfy the reach threshold, two HHs in NWG A_DP1_BW1 are reached, HH20 at 75.6% and another HH12 not shown. The 2 reached HHs are counted as watching at least 5 of the 7 maximum available ad spots on NWG A_DP1 during broadcast week 1.

NWG A_DP1_BW3 is ranked second and 3 distinct HHs are counted as watching at least 3 of the 3 maximum available ad spots. For example, HH18 and two additional HHs (e.g., HH5 and HH10 not shown) are identified as distinct HHs that contribute to the cumulative number of HHs effectively reached. Note that although HH20 is reached (98%), HH20 was counted in the first ranked NWG A_DP1_BW1, and is not counted again among the 3 distinct HHs for NWG A_DP1_BW3. The 3 distinct HHs added to the 2 HHs from the rank (or row) above bring the number of HHs cumulatively effectively reached to 5 HHs. NWG A_DP1_BW4 is ranked third and contribute 3 distinct HHs to bring the number of HHs cumulatively effectively reached to 8.

For NWG B_DP1_BW4, no distinct HHs are identified even though HH2, HH17, HH18, and HH20 all satisfy the reach threshold. For example, each of those HHs were previously identified in an earlier ranked NWG_DP_BW combination. Accordingly, the number of HHs cumulatively effectively reached remains at 8 HHs. Continuing through the various NWG_DP_BW combinations, the total number of distinct HHs cumulatively effectively reached is 19 HHs of the 20 HHs.

At step 550 reach and frequency estimator server 125 may determine which NWG_DP_BW combinations satisfy the reach percentage goal (if any). An estimated reach percentage may be determined as follows:

$$\text{Estimated Reach Percentage } (\%) = \frac{\text{No. of distinct } HHs \text{ of a population that view an ad spot at least once}}{\text{Total no. of } HHs \text{ of a population}}$$

Estimated Reach Percentage (%)=19/20=95%

Since the total number of HHs reached is 19 of the 20 HHs, the estimated reach percentage may be calculated as 95%. As shown in step 555 below, the effective reach percentage may be calculated as 85%.

Based on the viewership data, the number of times an ad spot is viewed for each HH reached is determined to be 179 impressions. The average minimum frequency that an ad spot is viewed across the population may be determined based on the number of impressions of the reached HHs of the population:

$$\text{Estimated Average Frequency} = \frac{\sum (\text{Frequency of viewing an ad for each } HH \text{ of a population that views an ad spot})}{\text{Total no. of } HHs \text{ of a population that view an ad spot}}$$

Estimated Average Frequency=179 impressions/20 HHs=8.950

Accordingly, each HH of the 20 HHs views an ad spot an average of 8.95 times over the 4 broadcast weeks, which exceeds the minimum frequency goal of F=5.

At step 555, reach and frequency estimator server 125 may allocate Ad Spots for those combinations that satisfy the reach percentage goal according to the rank. For example, to satisfy the reach percentage goal of 80% and/or the minimum frequency (F) where F=5, reach and frequency estimator server 125 may include the NWG_DP_BW combinations starting with rank 1 up to rank 18 as shown in FIG. 12 to meet the reach percentage goal of 80%. Reach and Frequency Estimator Server 125 may allocate ad spots as shown by the last column indicating the maximum available ad spots that are allocated according to rankings. Note that several of the NWG_DP_BW combinations do not contribute any ad spots to the media plan allocation (e.g., NW A_DP1_BW2 did not have any available inventory as shown in FIG. 8). NWG A_DP1_BW1 with rank 1 had 7 maximum available spots. FIG. 13 illustrates media plan selections according to an embodiment. The Spot-Plan column indicates the number of ad spots of the maximum available ad spots that are allocated by Reach and Frequency Estimator Server 125. For NWG A_DP1_BW1, for example, 7 ad spots of the 7 maximum available ad spots are allocated. Given that there are 4 quarter hours in a daypart, 28 average quarter hour impressions are estimated. In other words, by allocating the 7 ad spots during NWG A_DP1_BW1, Reach and Frequency Estimator Server 125 may determine that the ad spots will be viewed 28 times.

While reach is the number of HHs exposed to an ad at least once during the specific period, effective reach is the percentage of HHs that also satisfy the minimum frequency (F) during the specific period. In this example, of the 20 HHs that had 179 impressions, 17 HHs viewed an ad spot at least 5 times (e.g., 3 HHs did not meet the minimum frequency (F=5), and those 3 HHs had a combined total of 5 impressions). An effective reach percentage may be determined as follows:

$$\text{Effective Reach (\%)} = \frac{\text{No. of distinct } HHs \text{ of a population that view an ad spot at least } F \text{ times}}{\text{Total no. of } HHs \text{ of a population}}$$

$$\text{Effective Reach (\%)} = \frac{17\ HHs}{20\ HHs} = 85.0\%$$

Accordingly, the number of times an ad spot is viewed at least F times (e.g., F=5) for each HH reached of the population is 174 impressions (179 impressions−5 impressions).

Effective Average Frequency =

$$\frac{\sum (\text{Frequency of viewing an ad for each } HH \text{ of a population that views an ad spot at least } F \text{ times})}{\text{Total no. of } HHs \text{ of a population that view an ad spot at least } F \text{ times}}$$

Effective Average Frequency=174 impressions/17 HHs=10.235 which exceeds the minimum frequency goal of F=5.

Reach and Frequency Estimator Server 125 allocates ad spots according to the ranking as shown in FIGS. 12 and 13 to satisfy the reach percentage goal of 80% and/or the minimum frequency goal of F=5.

Method 500 Ends.

Computer System Implementation

Various embodiments can be implemented, for example, using one or more well-known computer systems, such as computer system 1400 shown in FIG. 14. Computer system 1400 can be any well-known computer capable of performing the functions described herein. For example, and without limitation, Reach and Frequency Estimator Server 125 (and/or other apparatuses and/or components shown in the figures) may be implemented using computer system 1400, or portions thereof.

Computer system 1400 includes one or more processors (also called central processing units, or CPUs), such as a processor 1404. Processor 1404 is connected to a communication infrastructure or bus 1406.

One or more processors 1404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 also includes user input/output device(s) 1403, such as monitors, keyboards, pointing devices, etc., that communicate with communication infrastructure 1406 through user input/output interface(s) 1402.

Computer system 1400 also includes a main or primary memory 1408, such as random access memory (RAM). Main memory 1408 may include one or more levels of cache. Main memory 1408 has stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary embodiment, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired and/or wireless, and which may include any combination of LANs, WANs, the Internet, etc. Control logic and/or data may be transmitted to and from computer system 1400 via communication path 1426.

In an embodiment, a tangible apparatus or article of manufacture comprising a tangible computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 14. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
one or more processors;
a memory coupled to the one or more processors, the one or more processors being configured to:
access past individual household (HH) level viewership data, available inventory data, and audience-related data from one or more databases;
receive target audience-related criteria, a HH level reach threshold, a reach percentage goal, and a HH level minimum frequency goal (F);
calculate a first probability that a first HH will tune to a first network group, daypart, broadcast week (NWG_DP_BW) combination based at least on a corresponding past individual HH level viewership data accessed;
determine a number of ad spots for the first NWG_DP_BW combination based on the first probability, the target audience-related criteria, the HH level reach threshold, and the HH level F; and
allocate ad spots according to a rank of Y NWG_DP_BW combinations including the first NWG_DP_BW combination, wherein each NWG_DP_BW combination of the Y NWG_DP_BW combinations satisfy the reach percentage goal,
wherein to determine the number of ad spots for the first NWG_DP_BW combination, the one or more processors are configured to:
calculate a weighted average probability for the first HH based at least on the rank of Y NWG_DP_BW combinations;
calculate a third probability of the first HH watching at least the HH level F ad spots of the first NWG_DP_BW combination based at least on the weighted average probability; and
determine that the first NWG_DP_BW combination satisfies the reach percentage goal based at least on the third probability.

2. The system of claim 1, wherein to determine the number of ad spots for the first NWG_DP_BW combination, the one or more processors are configured to:
calculate a second probability of the first HH watching at least 1 ad spot of the first NWG_DP_BW combination based at least on the first probability;
determine that the first HH of the first NWG_DP_BW combination is reached; and
rank the Y NWG_DP_BW combinations using the first probability and the second probability.

3. The system of claim 2, further comprising the one or more processors configured to: count a number of HHs reached for each NWG_DP_BW combination of the Y NWG_DP_BW combinations.

4. The system of claim 3, further comprising the one or more processors are further configured to count a number of HHs cumulatively effectively reached for each NWG_DP_BW combination of the Y NWG_DP_BW combinations.

5. The system of claim 4, wherein the one or more processors are configured to add an HH of the HHs reached to the number of HHs cumulatively effectively reached when the HH is distinct from any HH already included in the number of HHs cumulatively effectively reached.

6. The system of claim 4, wherein the one or more processors are configured to determine an estimated reach percentage comprising the number of HHs cumulatively reached divided by a total number of HHs of a population.

7. The system of claim 4, wherein the one or more processors are configured to determine an effective average frequency comprises a sum of impressions of HHs of a population divided by the number of HHs cumulatively effectively reached.

8. The system of claim 2, wherein the rank is based at least on: a highest number of HHs reached; a highest index; or a highest number of maximum available ad spots.

9. A non-transitory computer-readable medium having instructions stored thereon, which when executed by a processor in an electronic device cause the processor to perform operations comprising:
accessing past individual household (HH) level viewership data, available inventory data, and audience-related data from one or more databases;
receiving target audience-related criteria, an HH level reach threshold, a reach percentage goal, and an HH level minimum frequency goal (F);
calculating a first probability that a first HH will tune to a first network group, daypart, broadcast week (NWG_DP_BW) combination based at least on a corresponding past individual HH level viewership data accessed;
determining a number of ad spots for the first NWG_DP_BW combination based on the first probability calculated, the target audience-related criteria, the HH level reach threshold, and the HH level F; and
allocating ad spots according to a rank of Y NWG_DP_BW combinations including the first NWG_DP_BW combination, wherein each NWG_DP_BW combination of the Y NWG_DP_BW combinations satisfy the reach percentage goal,
wherein the determining the number of ad spots for the first NWG_DP_BW combination operation, comprises:
calculating a weighted average probability for the first HH based at least on the ranking;
calculating a third probability of the first HH watching at least the HH level F ad spots of the first NWG_DP_BW combination based at least on the weighted average probability; and
determining that the first NWG_DP_BW combination satisfies the reach percentage goal based at least on the third probability.

10. The non-transitory computer-readable medium of claim 9, wherein the determining the number of ad spots for the first NWG_DP_BW combination, the operations further comprise:
calculating a second probability of the first HH watching at least 1 ad spot of the first NWG_DP_BW combination based at least on the first probability;
determining that the first HH of the first NWG_DP_BW combination is reached; and
ranking the Y NWG_DP_BW combinations using the first probability and the second probability.

11. The non-transitory computer-readable medium of claim 10, further comprising counting a number of HHs reached for each NWG_DP_BW combination of the Y NWG_DP_BW combinations.

12. The non-transitory computer-readable medium of claim 11, further comprising counting a number of HHs cumulatively effectively reached for each NWG_DP_BW combination of the Y NWG_DP_BW combinations.

13. The non-transitory computer-readable medium of claim 12, comprising adding a HH of the HHs reached to the number of HHs cumulatively effectively reached when the HH is distinct from any HH already included in the number of HHs cumulatively effectively reached.

14. The non-transitory computer-readable medium of claim 10, wherein the ranking is based on at least one of: a highest number of HHs reached; a highest index; a highest number of maximum available ad spots; or an earliest broadcast week.

15. A method for a processor in an electronic device, comprising:
accessing past individual household (HH) level viewership data, available inventory data, and audience-related data from one or more databases;
receiving target audience-related criteria, an HH level reach threshold, a reach percentage goal, and an HH level minimum frequency goal (F);
calculating a first probability that a first HH will tune to a first network group, daypart, broadcast week (NWG_DP_BW) combination based at least on a corresponding past individual HH level viewership data accessed;
determining a number of ad spots for the first NWG_DP_BW combination based on the first probability calculated, the target audience-related criteria, the HH reach threshold, and the HH level F; and
allocating ad spots according to a rank of Y NWG_DP_BW combinations including the first NWG_DP_BW combination, wherein each NWG_DP_BW combination of the Y NWG_DP_BW combinations satisfy the reach percentage goal,
wherein the determining the number of ad spots for the first NWG_DP_BW combination, comprises:
calculating a weighted average probability for the first HH based at least on the ranking;
calculating a third probability of the first HH watching at least the HH level F ad spots of the first NWG_DP_BW combination based at least on the weighted average probability; and
determining that the first NWG_DP_BW combination satisfies the reach percentage goal based at least on the third probability.

16. The method of claim 15, wherein the determining the number of ad spots for the first NWG_DP_BW combination further comprises:
calculating a second probability of the first HH watching at least 1 ad spot of the first NWG_DP_BW combination based at least on the first probability;
determining that the first HH of the first NWG_DP_BW combination is reached; and
ranking the Y NWG_DP_BW combinations using the first probability and the second probability.

17. The system of claim 1, wherein the rank is based on an earliest broadcast week.

18. The method of claim 16, further comprising counting a number of HHs cumulatively effectively reached for each NWG_DP_BW combination of the Y NWG_DP_BW combinations.

19. The method of claim 18, further comprising: determining an estimated reach percentage comprising the number of HHs cumulatively reached divided by a total number of HHs of a population.

20. The method of claim 18, further comprising: determining an effective average frequency comprising a sum of impressions of HHs of a population divided by the number of HHs cumulatively effectively reached.

\* \* \* \* \*

UNITED STATES PATENT AND TRADEMARK OFFICE
CERTIFICATE OF CORRECTION

| | |
|---|---|
| PATENT NO. | : 10,979,754 B1 |
| APPLICATION NO. | : 16/125189 |
| DATED | : April 13, 2021 |
| INVENTOR(S) | : Karunanithi et al. |

Page 1 of 1

It is certified that error appears in the above-identified patent and that said Letters Patent is hereby corrected as shown below:

In the Drawings

On Sheet 14 of 14, FIG. 14, TAG 1428, Line 2, delete "entity(ies" and insert -- entity(ies) --, therefor.

In the Specification

In Column 1, Line 30, delete "FIG." and insert -- FIGS. --, therefor.

In Column 4, Line 8, delete "for" and insert -- 1 or --, therefor.

In Column 5, Line 65, delete "population).)" and insert -- population)). --, therefor.

In Column 6, Line 21, delete "a" and insert -- the --, therefor.

In Column 10, Line 46, delete "NWG B_DP2 BW4" and insert -- NWG B_DP2_BW4 --, therefor.

In Column 10, Line 59, delete "NWG B_DP2 BW4," and insert -- NWG B_DP2_BW4, --, therefor.

In Column 10, Line 64, delete "+3*0.500" and insert -- +3*0.375 + 3*0.500 --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*